US006477863B1

(12) United States Patent
Baret

(10) Patent No.: US 6,477,863 B1
(45) Date of Patent: Nov. 12, 2002

(54) METHOD FOR PRODUCING A DIELECTRIC COATING COMPRISING EMBOSSED PATTERNS ON A PLASMA PANEL FACEPLATE

(75) Inventor: Guy Baret, Grenoble (FR)

(73) Assignee: Thomson Multimedia, Boulogne-Billancourt (FR)

( * ) Notice: Subject to any disclaimer, the term of this patent is extended or adjusted under 35 U.S.C. 154(b) by 0 days.

(21) Appl. No.: 09/445,326

(22) PCT Filed: Jun. 5, 1998

(86) PCT No.: PCT/FR98/01154

§ 371 (c)(1), (2), (4) Date: Dec. 7, 1999

(87) PCT Pub. No.: WO98/57348

PCT Pub. Date: Dec. 17, 1998

(30) Foreign Application Priority Data

Jun. 10, 1997 (FR) ............................................ 97 07182

(51) Int. Cl.[7] ................................................ C03B 32/02

(52) U.S. Cl. ............................ 65/33.4; 65/33.6; 65/44; 65/60.2; 65/60.8

(58) Field of Search ................................ 65/33.4, 33.6, 65/44, 60.2, 60.8

(56) References Cited

U.S. PATENT DOCUMENTS 3,607,180 A * 9/1971 Merz et al. .................. 65/33.4
5,747,931 A * 5/1998 Riddle et al. ............... 313/581
5,853,446 A * 12/1998 Carre et al. .................. 65/17.3
5,948,130 A * 9/1999 Ostendarp ...................... 65/44
6,101,846 A * 8/2000 Elledge ....................... 65/102
6,140,759 A * 10/2000 Sreeram et al. ............. 313/493
6,184,621 B1 * 2/2001 Horiuchi et al. ............ 313/586

FOREIGN PATENT DOCUMENTS

| | | | |
|---|---|---|---|
| EP | 0135382 | 3/1985 | ............ H01J/17/49 |
| FR | 2417848 | 9/1979 | ............ H01J/17/36 |
| FR | 2738393 | 3/1997 | ............ H01J/17/49 |
| JP | 6-310033 | * 11/1994 | |
| JP | 08-273538 | 10/1996 | ............. H01J/9/02 |
| JP | 08-321258 | 12/1996 | ............. H01J/9/02 |
| JP | 09-012336 | 1/1997 | ........... C03C/17/04 |

OTHER PUBLICATIONS

Paten Abstracts of Japan, vol. 097, No. 005, May 30, 1997 & JP 09 012336.

Patent Abstracts of Japan, vol. 097, No. 004, Apr. 30, 1997 & JP 08 321258.

Patent Abstracts of Japan, vol. 097, No. 002, Feb. 28, 1997 & JP 08 273538.

* cited by examiner

*Primary Examiner*—Sean Vincent
(74) *Attorney, Agent, or Firm*—Joseph S. Tripoli; Dennis H. Irlbeck

(57) ABSTRACT

The invention concerns a method for producing on a plasma panel faceplate, a dielectric coating comprising embossed patterns. The invention is characterized in that a vitreous coat is produced on the plasma panel faceplate; a mould bearing embossed patterns is applied on the vitreous coat, then the faceplate and the mould are heated until a creep effect of the vitreous coat is obtained which causes the latter to match the form of the mould, thereby enabling to produce simultaneously and with improved quality with respect to prior art, a dielectric coating bearing embossed patterns such as for instance barriers. The invention is particularly applicable to alternating plasma panel.

12 Claims, 3 Drawing Sheets

FIG. 5
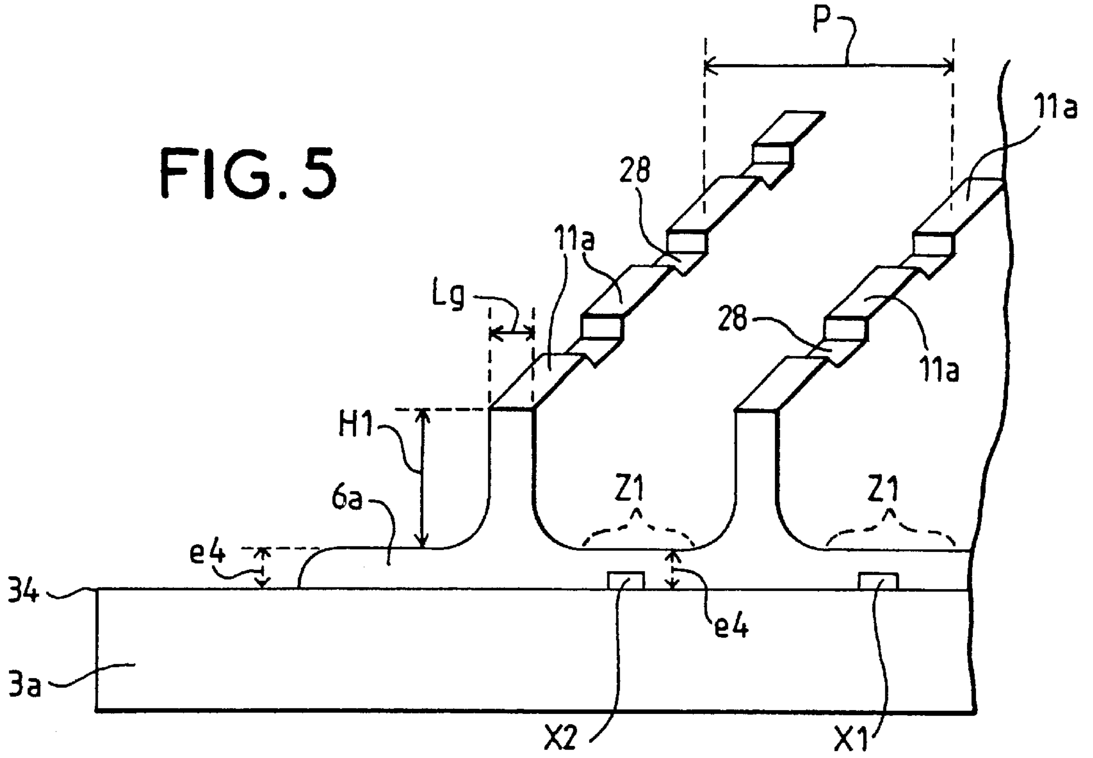
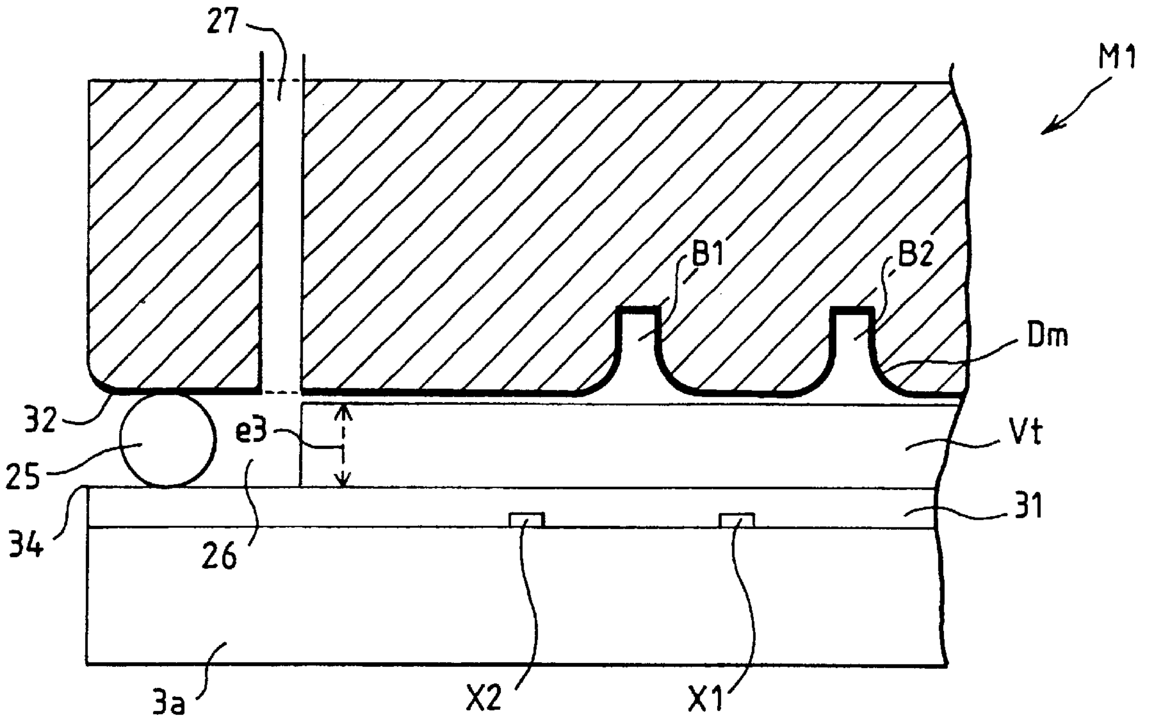
FIG. 6

METHOD FOR PRODUCING A DIELECTRIC COATING COMPRISING EMBOSSED PATTERNS ON A PLASMA PANEL FACEPLATE

The present invention relates to a process for the fabrication, on a plasma display panel sheet, of a dielectric layer with raised designs. The application of the invention is particularly advantageous when used with plasma panels of the alternative type.

Plasma panels (abbreviated to "PP" in the rest of this description) are image display screens of the "flat screen" type that operate using the principle of a discharge in gases.

PPs generally include two insulating sheets, each one carrying one or more networks of electrodes, the space between the sheets being gas-filled. The sheets are assembled together such that their networks of electrodes are mutually orthogonal. Each intersection of electrodes defines a cell corresponding to a gas space in which an electric discharge is produced when the cell is activated.

FIG. 1 represents by way of example, in a partial and simplified manner, a classic structure of a color alternative PP. Various types of alternative PPs are found, among which we can mention for example: those of the type using only two crossed electrodes to define and control a cell, as described notably in a French patent no. 2 417 848, and those of the so-called "coplanar structure" type whose structure and operation are described for example in the European patent EP-A- 0.135.382. Alternative PPs have a common characteristic, in that they have an internal memory effect in operation, owing to the fact that their electrodes are separated from the gas and the discharge by a layer of dielectric material.

In the example of FIG. 1, the PP is of the type having two crossed electrodes defining a cell. It is composed of two substrates or sheets 2, 3, of which one is a front sheet 2, i.e. the sheet that is on the same side as an observer (not shown); this sheet carries a first network of electrodes called "line electrodes", of which only 3 electrodes Y1, Y2, Y3 are shown. The line electrodes Y1 to Y3 are covered with a layer 5 of a dielectric material. The second sheet 3 forms the rear sheet. It is on the opposite side from the observer and carries a second network of electrodes called "column electrodes", of which only 5 electrodes X1 to X5 are shown. The two sheets 2, 3, are of a same material, generally glass; they are destined to be assembled together such that the networks of line and column electrodes are mutually orthogonal.

On the rear sheet 3, the column electrodes X1 to X5 are positioned at intervals of P, whose value (for example from 100 $\mu$m to 500 $\mu$m) depends on the definition of the image. They are they also covered with a layer 6 of dielectric material, whose thickness e1 is generally about 20 $\mu$m to 30 $\mu$m. In the example shown, the dielectric layer 6 is itself covered with layers of luminiferous materials forming bands 7, 8, 9 that correspond for example to the colors green, red and blue respectively. The rear sheet 3 also includes a network of barriers 11, parallel to the column electrodes X1 to X5 and to the luminiferous bands 7 to 9. These barriers 11 are placed between adjacent luminiferous bands so as to separate them.

The PP is formed by the assembly of the front and rear sheets 2, 3, this operation forming a matrix of cells C1 to Cn. The cells are defined at each intersection between a line electrode Y1 to Y3 and a column electrode X1 to X5, and each cell has a discharge zone whose section corresponds substantially to so-called "useful" areas formed by the surfaces facing the two crossed electrodes. The cells C1 to Cn are illustrated in the figure by cavities Ep1 to Epn made in the luminiferous bands 7 to 9. In the example shown, intersections made by the first line electrode Y1 with the column electrodes X1 to X5 define a line of cells C1 to C5, illustrated respectively by cavities Ep1 to Ep5. For each cell, the discharge in the gas causes electric charges to cumulate on the dielectrics 5, 6 facing the line and column electrodes, in other words at the positions of the cavities Ep1 to Epn.

The dielectric layers 5, 6 therefore have a particularly important function. They are generally made by stoving a glass frit: the stoving increases the density of the material until a glass is formed. Unfortunately, this method frequently leaves defects in the glass, such as bubbles and depressions (resulting in insufficient thickness), or even holes. The ability of the dielectric to hold electrical tension is weakened at these defects. In the case for example of the dielectric layer 6, the dielectric must have breakdown voltages of a few hundred volts.

Another difficulty in the fabrication of PPs is the making of the barriers 11. These barriers commonly act as spacers: they determine the separation distance between the front sheet 2 and the rear sheet 3. This spacing distance is then defined by the height H1 of the barriers 11, commonly from 50 $\mu$m to 150 $\mu$m depending on the applications. This requires a high level of precision in the height H1 in order to assure optimal discharge characteristics, and very small dispersion in the value of the heights H1 of the different barriers. The barriers must also have a suitable geometry in order to enhance the luminous efficiency of the structure. We note that the barriers 11 may also have another function known as "confinement", assuring that the cells are "isolated" from each other.

These various criteria are difficult to respect using classical methods of fabrication.

FIG. 2 represents a barrier made in the classic manner by superposed layers: a sheet 20 carries electrodes 21 which are themselves covered with a dielectric layer 22; a barrier 23 is formed on the layer 22 by means of a number N of successive serigraphy operations, each one producing a layer Cs1, . . . , CsN; the number N may be for example between 10 and 20, depending on the height H1 required.

One disadvantage of this method is the large number of serigraphy operations necessary to obtain the height H1. Another disadvantage is the irregular profile of the sides of the barrier 23 which is due to the impossibility of perfectly superimposing the successive layers Cs1 to CsN. Finally, another disadvantage is that it is difficult to achieve the required precision in the height of the barrier, since the layers Cs1 to CsN are not of uniform thickness.

Another classic method of fabrication of the barriers makes use of blasting operations (not shown). This consists in protecting with a mask the zones that are to form the barriers, then blasting the surface to erode the material in the unprotected zones. One of the problems of this method is that the geometry of the barriers is limited, notably the sides are necessarily entirely vertical, which does not favor high luminous efficiency. Another drawback is the risk of damage to the underlying dielectric layer during the blasting operation, which imposes many particularly onerous precautions. Finally, a serious disadvantage of this method is that it makes use of large quantities of grit contaminated by heavy metals contained in the layers subject to blasting, and which must therefore be reprocessed.

The present invention proposes a process that enables a dielectric layer with raised designs, such as for example the network of barriers described previously, to be made on a PP sheet, in a simple manner and avoiding the defects and disadvantages mentioned previously.

The invention is therefore a process for fabrication of a dielectric layer having raised designs on a plasma display panel sheet, consisting in depositing on the sheet a layer containing a glass frit, then vitrifying this layer which becomes a "vitreous layer", characterized in that a mold carrying raised designs is then brought to bear on the vitreous layer, this mold and the sheet bearing the vitreous layer being heated until a creep effect occurs in the vitreous layer enabling it to adopt the shape of the mold.

The term "raised design" with respect to the surface of the dielectric layer is understood to refer both to projecting elements forming protuberances and projections, like the barriers 11, and to hollow elements like the cavities Ep1 to Epn, for example.

The invention will be better understood on reading the description below of an embodiment, taken only as a non-limitative example, with reference to the appended drawings, in which:

FIG. 1, already described, represents a prior-art structure of a color plasma display panel;

FIG. 5 represents a dielectric layer obtained using the process according to the invention;

FIG. 6 illustrates the forming of a dielectric layer on an already existing dielectric layer using the process according to the invention.

Figure 1:
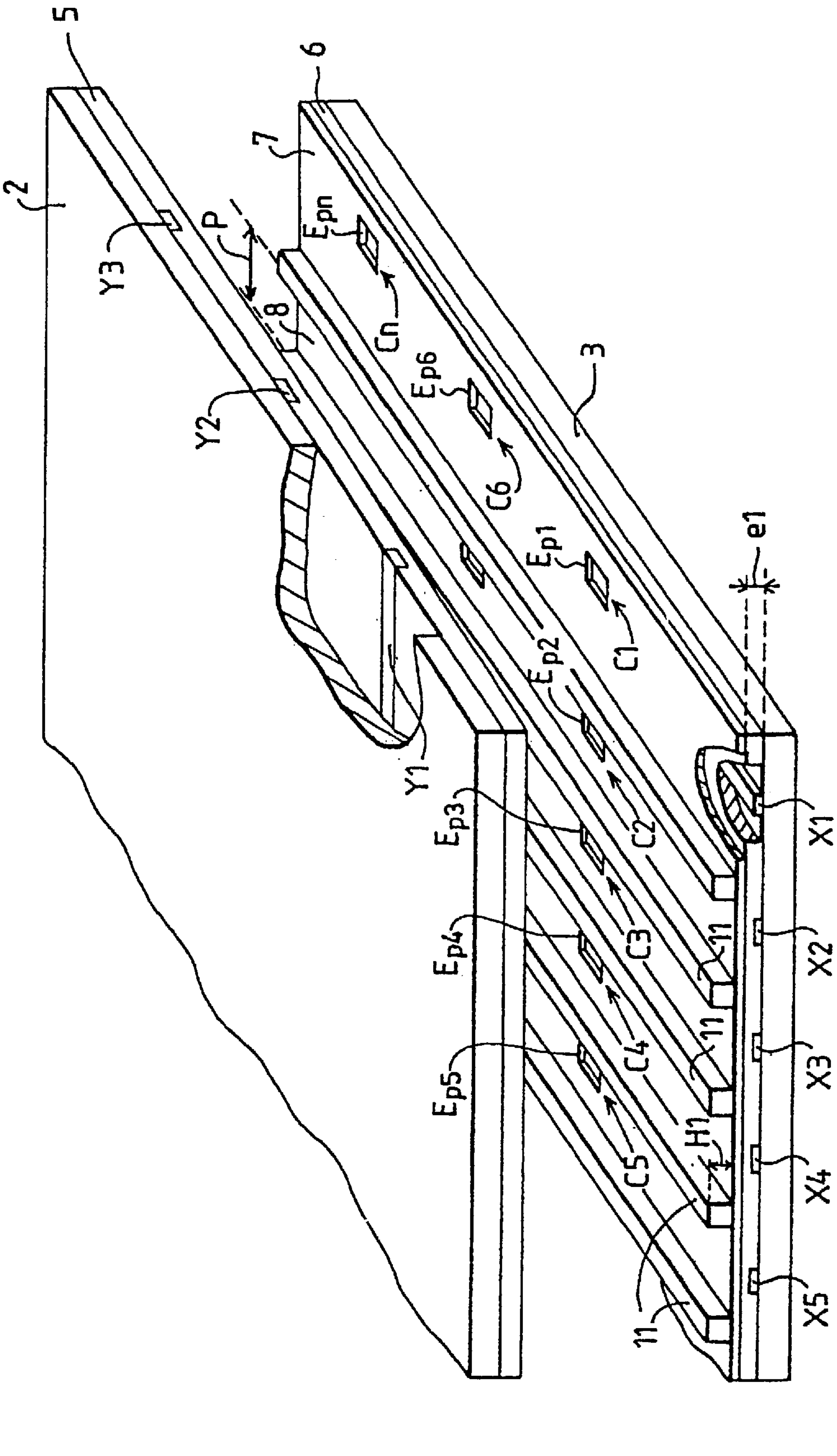
FIG.1 PRIOR ART
Figure 2:
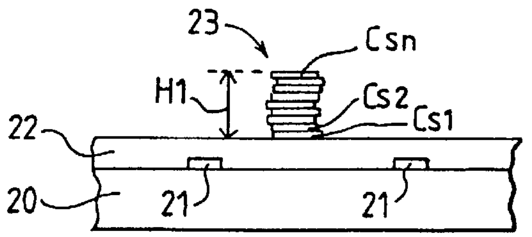
FIG.2 PRIOR ART
FIG. 2 represents the fabrication of the barrier shown in FIG. 1, using a process of the prior art.
Figure 3:
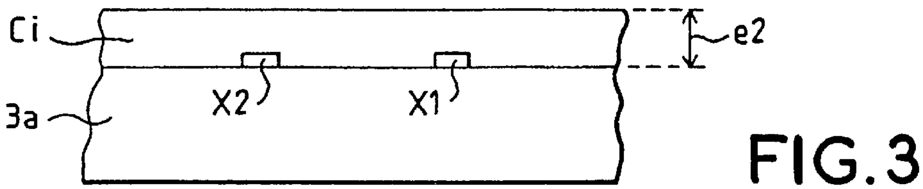
FIG. 3 illustrates a first stage of the process according to the invention.

FIG. 3 represents a partial view of a sheet 3*a* intended to constitute, for example, the rear sheet of a PP similar to the rear sheet 3 shown in FIG. 1. The sheet 3*a* carries a network of electrodes X1, X2 obtained in a classical manner; for reasons of clarity, only two electrodes are shown.

The process of the invention consists first in depositing, by serigraphy, for example, on the glass surface of the sheet 3*a* a layer Ci called an "intermediate layer" that covers the electrodes X1, X2. The intermediate layer Ci is made of a paste containing a glass frit of classic composition, deposited with a thickness e2. Once the intermediate layer Ci has dried, it is stoved at a temperature typically of 550° C. to 600° C. to vitrify it and constitute a vitreous layer Vt shown in FIG. 4. It is noted that the vitreous layer Vt has a thickness e3 less than the thickness e2 of the intermediate layer Ci. The ratio of the thicknesses e2 and e3 can vary notably according to the composition of the layer; it may be, for example, about 2; for a given composition, it is known and perfectly reproducible.

Figure 4:
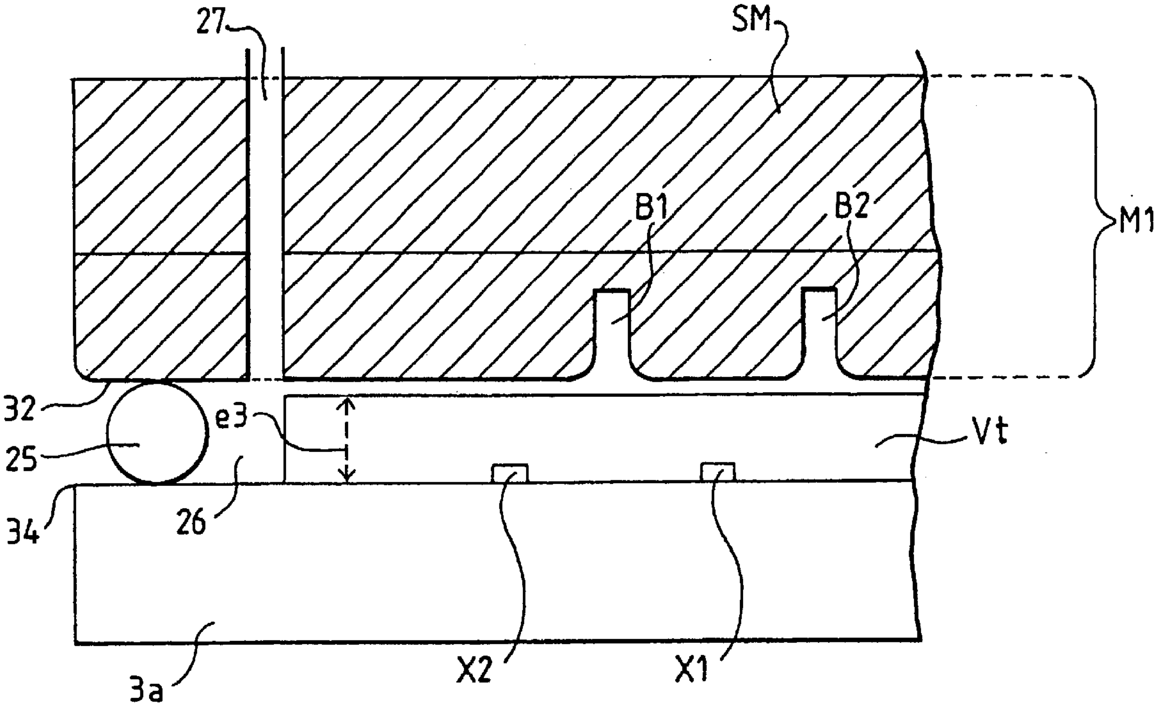
FIG. 4 represents the use of a mold in a later stage of the process according to the invention.

In the next phase, illustrated in FIG. 4, we apply on the vitreous layer Vt a mold M1, shown positioned above the sheet 3*a*. The mold M1 includes patterns that are to be formed in the vitreous layer Vt; in this embodiment these are barriers in the form of hollows B1, B2. These barriers can be of carrier barrier type and play the role of spacers. They may also have a confinement function, isolating the cells from each other.

The assembly formed by the mold M1 and the sheet 3*a* bearing the vitreous layer Vt is then heated, in an oven for example, to a temperature that facilitates creep in the vitreous layer Vt. Creep is an effect in which movements of material occur over short distances, for example of a few hundred microns. In the present case, in combination with the force with which the mold M1 is applied to the vitreous layer Vt, the creep enables this vitreous layer to adopt the shape of the mold M1; once the cavities of the mold M1 are filled, the shape and thickness no longer evolve. The mold M1 must of course be pressed on the vitrified intermediate layer Vt with a relatively uniform pressure over the surface of this layer, for example less than about 0.9 bar ($9.10^4$ Pa).

In practice, the conditions of creep of the vitreous layer Vt depend on both its nature (its chemical composition and therefore its viscosity at the stoving temperature) and three following parameters: temperature, time, and application pressure of the mold M1, in other words the force with which the mold is maintained against the vitrified intermediate layer Vt. For example, to obtain satisfactory creep in the case of a glass of the PbO, $B_2O_3$, $SiO_2$ type (whose vitreous transition temperature is about 410° C.), the assembly formed by the mold M1 and the sheet 3*a* is heated to a temperature of about 460° C. for about 30 minutes at a pressure corresponding substantially to 0.5 atmospheres. Increasing the pressure enables the duration and/or the temperature to be reduced.

A uniform pressure of the mold M on the sheet 3*a* can be achieved in a relatively simple, well-known manner by applying pneumatic pressure. This uniform pressure can also be provided by creating a depression between the mold M1 and the sheet 3*a*, as illustrated in FIG. 4. FIG. 4 shows that by placing a seal 25 around the outer edge 34 of the sheet 3*a*, between this sheet 3*a* and the mold M1, we form an internal space 26 in which a partial vacuum can be formed. For this purpose, the mold M1 is traversed near its edge by a penetration 27 running from the internal face 32 carrying the patterns to the external face, in order to be able to connect classical means of evacuation (not shown) to this internal space 26.

FIG. 5 represents the sheet 3*a* on which are formed, following application of the mold M1 and using the process according to the invention, a dielectric layer 6*a* with barriers 11*a*. We note that the application pressure of the mold is important, because it is this parameter in particular that assures the absence of defects in certain highly compressed parts or zones Z1 of the dielectric layer 6*a*. In the non-limitative embodiment described here, these most highly compressed zones Z1 have a thickness e4 that is the smallest, and correspond to the zones in which the electric discharges occur in each cell; these zones Z1 must therefore have the greatest dielectric strength.

The application of the mold M1 with a pressure provided by creating a partial vacuum between the sheet 3*a* and the mold, as mentioned above, not only provides for good uniformity of the compression force, but also enables better elimination from the dielectric layer 6*a* of any bubbles whose presence would tend to degrade the dielectric strength, particularly in the zones Z1. The presence of such a depression between the sheet 3*a* and the mold M1 therefore allows a lower initial stoving temperature of the glass frit, for example 500° C. to 540° C. instead of the 550° C. to 600° C. indicated previously.

The process according to the invention provides for the best possible quality of the dielectric layer 6*a* and also offers the advantage of producing the dielectric layer 6*a* and the barriers 11*a* at the same time, with far fewer operations than in known methods. The process also makes it quite easy to give the barriers 11*a* the required profile (notably the slope of their sides) and height H1, with good reproduction of this height for all the barriers. We note that it is also possible, and much easier than in the prior art, to make slots or recesses 28 in the tops of the barriers 11*a* of height H1, in other words localized reductions of this height which enables a so-called "cell conditioning" effect; the hollows of the barriers B1, B2 of the mold M1 can include suitable bosses for this purpose (not shown).

The thickness e3 of the vitreous layer Vt shown in FIG. 4 must enable the production of the required values of the height H1 of the barriers 11*a* and the thickness e4 of the dielectric layer 6*a*. This thickness e3 can be calculated as a function of the height H1 of the barriers 11*a*, their width Lg, the interval P between these barriers, and the thickness e4 of the dielectric layer 6*a*, through the relation:

$$e3=e4+H1\times Lg/P$$

We note that in these conditions the thickness e4 of the dielectric layer 6*a* can be adjusted by calculating the appropriate value of the thickness e3 of the vitreous layer Vt.

The mold M1 can be in the form of a metal plate of which one face 32 carries the patterns to be reproduced, which are produced for example by an electroforming or engraving technique.

For the purpose of reducing variations due to the differences between the thermal expansion coefficients of the sheet 3*a* and the mold M1 (again with reference to FIG. 4), this mold can be provided by a metallized glass support or sheet SM on which the metallic deposit Dm has been electroformed to form the designs to be reproduced.

In the example described earlier, the dielectric layer 6*a* and the barriers 11*a* are made directly on the sheet 3*a*. However the process according to the invention also enables them to be formed on a so-called "initial" layer of dielectric material for example, on condition that the temperature at which this initial layer softens is higher than the previously mentioned vitreous transition temperature of the vitreous layer Vt. This method can be used, for example, when we wish to isolate the electrodes by a dielectric made of dielectric layers of different types.

This configuration is shown in FIG. 6, in which a sheet 3*b* includes a glass support 30 bearing electrodes X1, X2; these electrodes are covered by a dielectric layer 31 forming the initial layer that is itself covered by the vitreous layer Vt yielding the dielectric layer and the barriers obtained by the process according to the invention. The initial layer 31 could in this case constitute for example a white dielectric (by including titanium in its composition) so as to form a white background in a PP sheet intended to reflect light towards the front; the creep characteristics of such dielectrics are very poor, so this initial layer would not therefore be affected by the process according to the invention necessary to obtain the dielectric layer.

What is claimed is:

1. Process for fabrication of a dielectric layer having raised designs on a sheet of a plasma display panel, comprising in depositing on the sheet an initial layer and depositing a layer containing a glass frit on said initial layer, vitrifying this layer which becomes a vitreous layer, wherein a mold carrying the raised designs is then brought to bear on the vitreous layer, the mold and the sheet bearing the vitreous layer being heated until a creep effect occurs in the vitreous layer enabling it to adopt the shape of the mold and constitute the dielectric layer with raised designs.

2. Process according to claim 1, wherein the initial layer is a dielectric layer which softens at a temperature higher than that to which the vitreous layer is subjected to obtain its creep.

3. Process according to claim 1, wherein the initial layer is white.

4. Process according to claim 1, wherein the mold is in the form of a metal plate of which one face carries the designs to be molded.

5. Process according to claim 1, wherein the mold includes a glass support.

6. Process according to claim 5, wherein the glass support is coated on one face with a metal deposit in which the designs to be molded are made.

7. Process according to claim 1, wherein the raised designs are barriers of the carrier barrier type acting as spacers.

8. Process according to claim 1, wherein the raised designs are barriers of the type providing a confinement function.

9. Process according to claim 1, wherein the mold is pressed onto the vitreous layer by means of pneumatic pressure on the mold and the sheet.

10. Process according to claim 1, wherein a partial vacuum is created between the mold and the sheet in order to press the mold onto the vitreous layer.

11. Process according to claim 1, wherein the pressure of the mold on the vitreous layer is less than about $9.10^4$ Pa.

12. Process according to claim 1, wherein the dielectric layer obtained has a thickness that results from the thickness given to the vitreous layer.

* * * * *